(12) United States Patent
Cadieux et al.

(10) Patent No.: US 8,916,829 B2
(45) Date of Patent: Dec. 23, 2014

(54) SYSTEM AND METHOD FOR ASSAYING A RADIONUCLIDE

(75) Inventors: James R. Cadieux, Aiken, SC (US); George S. King, III, Aiken, SC (US); Glenn A. Fugate, Graniteville, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 376 days.

(21) Appl. No.: 13/558,464

(22) Filed: Jul. 26, 2012

(65) Prior Publication Data

US 2013/0043398 A1 Feb. 21, 2013

Related U.S. Application Data

(60) Provisional application No. 61/525,018, filed on Aug. 18, 2011.

(51) Int. Cl.
*G01T 1/24* (2006.01)
*G01T 1/204* (2006.01)

(52) U.S. Cl.
CPC .. *G01T 1/204* (2013.01); *G01T 1/24* (2013.01)
USPC . 250/362; 250/370.09; 250/369; 250/370.02; 250/367

(58) Field of Classification Search
CPC .......... G01T 1/24; G01T 1/204; G01T 1/1603
USPC .......... 250/370.02, 362, 369, 370.06, 370.09, 250/364
See application file for complete search history.

(56) References Cited

U.S. PATENT DOCUMENTS

| | | | | |
|---|---|---|---|---|
| 3,772,512 A | * | 11/1973 | Laney | 250/366 |
| 3,935,556 A | * | 1/1976 | Kampfer | 340/854.9 |
| 3,978,337 A | * | 8/1976 | Nickles et al. | 250/367 |
| 3,988,615 A | * | 10/1976 | Umbarger et al. | 250/253 |
| 4,016,418 A | * | 4/1977 | Horrocks et al. | 250/252.1 |
| 4,031,392 A | * | 6/1977 | Giraud et al. | 250/328 |
| 4,060,728 A | * | 11/1977 | Horrocks | 250/328 |
| 4,075,480 A | * | 2/1978 | Horrocks | 250/328 |
| 4,395,635 A | * | 7/1983 | Friauf et al. | 250/366 |
| 4,476,388 A | * | 10/1984 | Yakubovich et al. | 250/361 R |
| 4,652,751 A | * | 3/1987 | Rundt et al. | 250/252.1 |

(Continued)

OTHER PUBLICATIONS

Configuration of an alpha-gamma coincidence spectrometer for utilization of safeguards measurements, Katharina Breitenecker, et al., Applied Radiation and Isotopes 67 (2009) 2088-2091.

(Continued)

*Primary Examiner* — David Porta
*Assistant Examiner* — Djura Malevic
(74) *Attorney, Agent, or Firm* — Dority & Manning, P.A.

(57) ABSTRACT

A system for assaying a radionuclide includes a liquid scintillation detector, an analyzer connected to the liquid scintillation detector, and a delay circuit connected to the analyzer. A gamma detector and a multi-channel analyzer are connected to the delay circuit and the gamma detector. The multi-channel analyzer produces a signal reflective of the radionuclide in the sample. A method for assaying a radionuclide includes selecting a sample, detecting alpha or beta emissions from the sample with a liquid scintillation detector, producing a first signal reflective of the alpha or beta emissions, and delaying the first signal a predetermined time. The method further includes detecting gamma emissions from the sample, producing a second signal reflective of the gamma emissions, and combining the delayed first signal with the second signal to produce a third signal reflective of the radionuclide.

19 Claims, 7 Drawing Sheets

(56) References Cited

U.S. PATENT DOCUMENTS

| | | | | |
|---|---|---|---|---|
| 4,687,935 | A * | 8/1987 | Nurmi et al. | 250/361 R |
| 4,742,226 | A * | 5/1988 | De Filippis | 250/328 |
| 4,914,300 | A * | 4/1990 | Kalish | 250/369 |
| 4,987,306 | A * | 1/1991 | Dodson | 250/362 |
| 5,146,093 | A * | 9/1992 | Valenta et al. | 250/362 |
| 5,229,604 | A * | 7/1993 | Larson et al. | 250/255 |
| 5,231,290 | A * | 7/1993 | Czirr et al. | 250/390.11 |
| 5,289,386 | A * | 2/1994 | Anderson | 702/32 |
| 5,412,216 | A * | 5/1995 | Dodson, Jr. | 250/364 |
| 5,442,180 | A * | 8/1995 | Perkins et al. | 250/367 |
| 5,532,944 | A * | 7/1996 | Battista | 708/3 |
| 5,675,151 | A * | 10/1997 | Oka et al. | 250/368 |
| 5,793,046 | A * | 8/1998 | Jeffers et al. | 250/364 |
| 6,064,068 | A * | 5/2000 | Bartle | 250/369 |
| 6,080,989 | A * | 6/2000 | Royle et al. | 250/366 |
| 6,303,936 | B1 * | 10/2001 | DeVol et al. | 250/364 |
| 6,392,236 | B1 * | 5/2002 | Maekawa et al. | 250/369 |
| 6,452,191 | B1 * | 9/2002 | Johnson et al. | 250/385.1 |
| 6,492,642 | B1 * | 12/2002 | Belanov et al. | 250/364 |
| 7,206,376 | B2 * | 4/2007 | Fitzgerald | 378/54 |
| 7,277,521 | B2 * | 10/2007 | Norman et al. | 376/156 |
| 7,342,231 | B2 * | 3/2008 | Warburton et al. | 250/362 |
| 7,368,722 | B2 * | 5/2008 | Berthold et al. | 250/369 |
| 7,683,334 | B2 * | 3/2010 | Farsoni et al. | 250/367 |
| 7,964,848 | B2 * | 6/2011 | Hamby et al. | 250/362 |
| 8,039,810 | B2 * | 10/2011 | Rodgers et al. | 250/370.11 |
| 8,274,056 | B2 * | 9/2012 | Akers et al. | 250/367 |
| 8,374,993 | B2 * | 2/2013 | Ramsden et al. | 706/62 |
| 8,565,860 | B2 * | 10/2013 | Kimchy et al. | 600/436 |
| 2002/0150194 | A1 * | 10/2002 | Wielopolski et al. | 376/160 |
| 2007/0051892 | A1 | 3/2007 | Warburton et al. | |
| 2007/0263764 | A1 * | 11/2007 | Mccallum et al. | 378/19 |
| 2008/0260100 | A1 * | 10/2008 | Tarancon Sanz et al. | 378/66 |
| 2009/0101830 | A1 | 4/2009 | Craig et al. | |
| 2009/0261261 | A1 * | 10/2009 | Rodgers et al. | 250/370.11 |
| 2010/0072385 | A1 * | 3/2010 | Peng et al. | 250/394 |
| 2010/0282976 | A1 * | 11/2010 | Le Tourneur | 250/370.02 |

OTHER PUBLICATIONS

The BGO Alpha-Gamma Scintillation Spectrometer, Yehoshua Kalish, Medical Physics Department, Beilinson Medical Center, Petah-Tiqva, Israel, Apr. 1996.

* cited by examiner

US 8,916,829 B2

SYSTEM AND METHOD FOR ASSAYING A RADIONUCLIDE

PRIORITY CLAIM

The present application claims priority to U.S. Provisional Application Ser. No. 61/525,018, filed Aug. 18, 2011, and which is incorporated herein by reference for all purposes.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

The present invention generally involves a system and method for assaying a radionuclide. In particular embodiments, the system and method may be used to detect and/or measure a specific radionuclide in a high background environment.

BACKGROUND OF THE INVENTION

Various systems and methods are known in the art for assaying unidentified radionuclides to provide a qualitative and/or quantitative estimate of the source and/or type of the radioactive material present. For example, radionuclides naturally decay according to known and predictable decay chains that produce one or more isotopes until eventually a stable isotope is reached, and each decay generates alpha, beta, and/or gamma emissions. The alpha, beta, and/or gamma emissions may be measured to determine the specific radionuclides present in a sample. For example, the energy levels and/or timing of the alpha, beta, and/or gamma emissions may be measured to identify each radionuclide producing the emissions, and the ratio of the specific radionuclides present in the sample may then be used to identify the source and/or type of the radioactive material present.

For many of the radionuclides of interest, however, beta emissions are characterized by a broad energy continuum and alpha emissions by extremely short ranges. Their assay typically requires extensive chemical purification of the elements of interest and preparation of an extremely thin deposit of the activity prior to measurement. This is particularly true of alpha emitting actinide isotopes. It may be problematical to accomplish the measurement of these alpha emitters in a timely manner in a sample with a complex mixture of beta and gamma-ray activities such as "fresh" fission products. In addition, low energy gamma emissions are difficult to distinguish from other Compton scattering events. Therefore, an improved system and method for assaying alpha emitting radionuclides in a high beta/gamma background environment would be useful.

BRIEF DESCRIPTION OF THE INVENTION

Aspects and advantages of the invention are set forth below in the following description, or may be obvious from the description, or may be learned through practice of the invention.

One embodiment of the present invention is a system for assaying a radionuclide in a sample. The system includes a liquid scintillation detector, a single-channel analyzer connected to an output of the liquid scintillation detector, and a delay circuit connected to an output of the single-channel analyzer. The system further includes a gamma detector and a multi-channel analyzer connected to an output of the delay circuit and an output of the gamma detector, wherein the multi-channel analyzer produces a signal reflective of the radionuclide in the sample.

Another embodiment of the present invention is a system for assaying a radionuclide in a sample. The system includes a sample chamber, a liquid scintillation detector connected to the sample chamber, and a gamma detector connected to the sample chamber. A single-channel analyzer is connected to an output of the liquid scintillation detector, and a delay circuit is connected to an output of the single-channel analyzer. An amplifier is connected to an output of the gamma detector. A multi-channel analyzer is connected to an output of the delay circuit and an output of the amplifier, wherein the multi-channel analyzer produces a signal reflective of the radionuclide in the sample.

The present invention may also include a method for assaying a radionuclide that includes selecting a sample to be tested, detecting at least one of alpha or beta emissions from the sample with a liquid scintillation detector, producing a first signal reflective of at least one of the alpha or beta emissions detected from the sample, and delaying the first signal a predetermined time. The method further includes detecting gamma emissions from the sample, producing a second signal reflective of the gamma emissions detected from the sample, and combining the delayed first signal with the second signal to produce a third signal reflective of the radionuclide in the sample.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
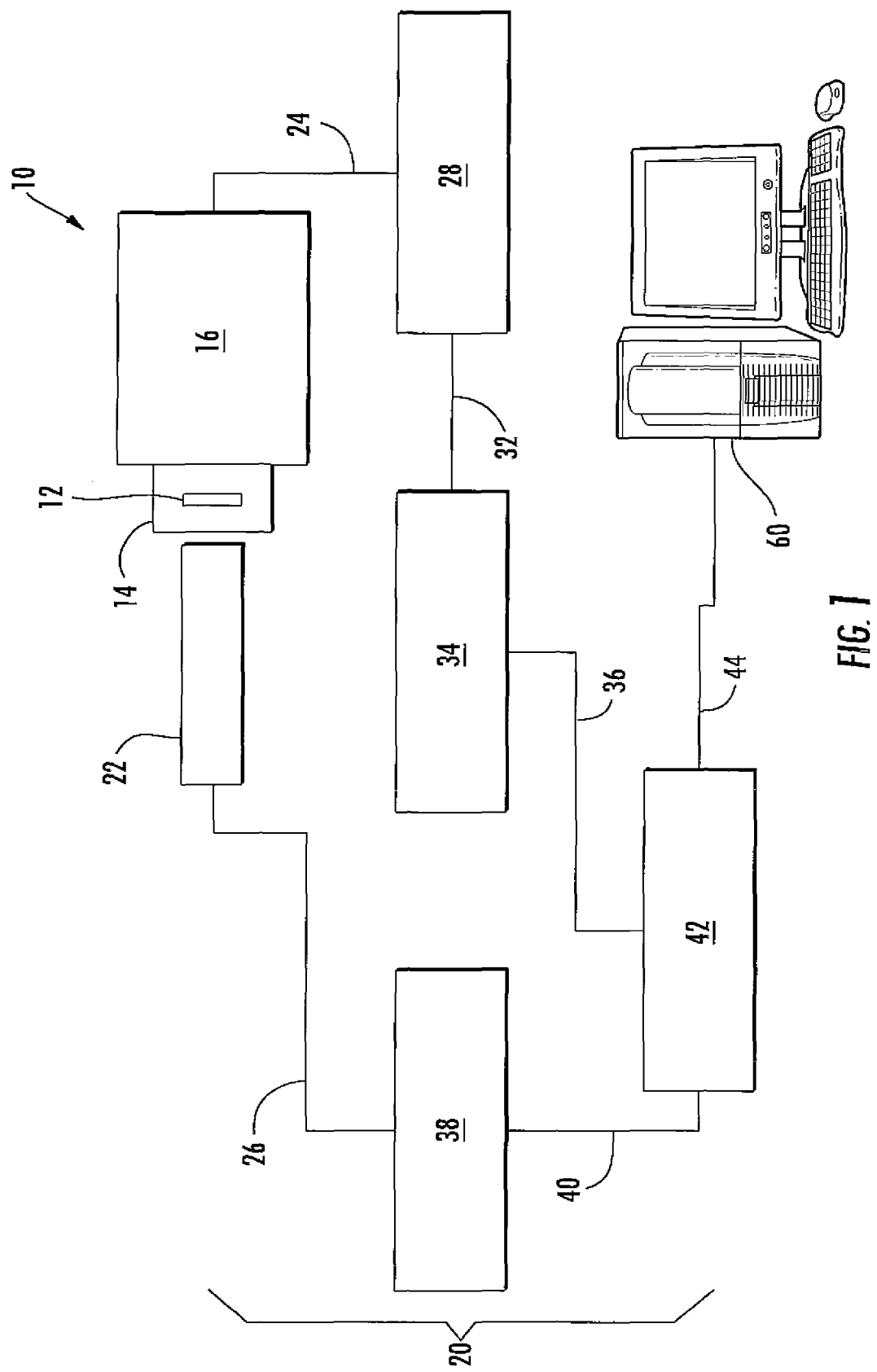
FIG. 1 is block diagram of a system according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention provide a system and method for assaying a radionuclide in a sample. In particular embodiments, a liquid scintillation detector may be used to detect and measure alpha and/or beta emissions, and a gamma detector may be used to detect and measure gamma emissions. The detected alpha and/or beta emissions may then be processed by a single-channel analyzer and a delay circuit before being compared to the detected gamma emissions in a multi-channel analyzer. The coincidence in timing between the particular alpha and/or beta emissions and the gamma emissions may then be used to identify the presence and/or amount of a particular radionuclide in the sample. Although specific embodiments of the present invention will be illustrated in the context of $^{226}$Ra and $^{241}$Am decay chains, one of ordinary skill in the art will appreciate that embodiments of the present invention may be readily adaptable to other decay schemes, and the present invention is not limited to any particular decay scheme unless specifically recited in the claims.

FIG. 1 provides block diagram of a system 10 for assaying a sample 12 containing a radionuclide according to one embodiment of the present invention. The system 10 generally includes a sample chamber 14 jointly connected to a liquid scintillation detector 16 and a gamma detector 22, and the detectors 16, 18 in turn provide various outputs to a coincidence circuit 20. The sample chamber 14 may comprise, for example, a carbon polymer housing such as bakelite and may be incorporated into the liquid scintillation detector 16 and/or the gamma detector 22 so that the sample 12 in the sample chamber 14 may be simultaneously exposed to both detectors 16, 18.

The liquid scintillation detector 16 may comprise any liquid scintillation spectrometer known in the art for detecting and/or measuring alpha and/or beta emissions from the sample 12. For example, the liquid scintillation detector 16 may comprise a photon-electron rejecting alpha liquid scintillation (PERALS) spectrometer modified to incorporate a carbon polymer sample chamber 14 as previously described. The sample 12 may be dissolved, immersed, and/or suspended in the sample chamber 14 in a commercially or user prepared cocktail, such as napthalene and/or toluene, obviating the need for extensive purification or preparation of the sample 12 required in conventional surface barrier detectors. In addition, the sample 12 is exposed to the liquid scintillation detector 16 in a 4 pi geometry. The 4 pi geometry refers to the solid angle (4 pi steradians) by which the liquid scintillation detector 16 may "view" the sample 12, allowing the liquid scintillation detector 16 to completely surround the sample 12 and thus detect virtually 100% of alpha and/or beta emissions from the sample 12. In contrast, the efficiency of conventional surface barrier detectors is generally based on a 2 pi geometry, which limits detection efficiency to a maximum of 50%. Also, in surface barriers detectors the absorption of the alpha emissions and the degraded energy resolution of the alpha emissions decrease the effective efficiency. The increased efficiency and resolution of the liquid scintillation detector 16 thus allows the liquid scintillation detector 16 to be programmed or set to discriminate scintillations produced by alpha and/or beta emissions based on the magnitude and/or timing of the scintillations produced by the respective emissions.

The gamma detector 22 may comprise any suitable spectrometer known in the art for detecting and/or measuring gamma emissions from the sample 12. For example, the gamma detector 22 may comprise a high purity germanium (HPGe) low energy photon spectrometer (LEPS) manufactured by ORTEC® connected to the sample chamber 14 as previously described. As will be described, the noise reduction provided by the coincidence circuit 20 may allow the use of a lower resolution but more durable gamma detector 22, such as a bismuth germanate (BGO) detector.

As the radionuclides in the sample 12 undergo alpha and/or beta decay to a daughter isotope, each alpha and beta emission from the sample 12 impacts compounds contained in the liquid scintillation cocktail to produce a scintillation having a magnitude proportional to the energy level of the respective alpha or beta emission that is measured by the detector 16. Accordingly, the liquid scintillation detector 16 provides an output 24 to the coincidence circuit 20 that may reflect the number, magnitude, and timing of the scintillations produced by the alpha or beta emissions detected from the sample 12. The daughter isotopes in the sample 12 subsequently undergo additional alpha, beta, and gamma decays, and the gamma detector 22 similarly provides an output 26 to the coincidence circuit 20 that may reflect the number, magnitude, and timing of the subsequent gamma emissions detected from the sample 12.

As shown in FIG. 1, the liquid scintillation detector output 24 and the gamma detector output 26 flow through parallel paths in the coincidence circuit 20 that discriminate, amplify, and adjust the timing of the various outputs 24, 26. For example, on the liquid scintillation detector 16 side of the coincidence circuit 20, a single-channel analyzer 28 may be connected to the output 24 of the liquid scintillation detector 16 to receive the liquid scintillation detector output 24. The single-channel analyzer 28 may be programmed or set to detect scintillations in the output 24 matching a predetermined magnitude or timing. For example, a 550A single-channel analyzer manufactured by ORTEC® may be connected to the output 24 of the liquid scintillation detector 16 and set to accept or count scintillations matching a predetermined shape associated with the alpha and/or beta emissions of a particular radionuclide. The single-channel analyzer 28 may in turn produce an analog or digital output 32 reflecting the number and timing of the scintillations produced by the alpha and/or beta emissions that match or fall within an acceptable tolerance of the predetermined shape associated with the particular radionuclide. A delay circuit 34 may be connected to the output 32 of the single-channel analyzer 28 to provide coincidence timing between the alpha and/or beta emissions and the subsequent gamma emissions. For example, a 416 Gate and Delay Generator manufactured by ORTEC® may be connected to the output 32 of the single-channel analyzer 28 to provide an output 36 having a predetermined amplitude, polarity, and width for each alpha or beta emission detected by the liquid scintillation detector 16 that also falls within the predetermined magnitude set in the single-channel analyzer 28.

On the gamma detector 22 side of the coincidence circuit 20, an amplifier 38 may be connected to the output 26 of the gamma detector 22 to enhance the information provided in the output 26 of the gamma detector 22. The amplifier 38 may in turn produce an output 40 reflecting the enhanced number, magnitude, and timing of the gamma emissions detected from the sample 12.

As shown in FIG. 1, a multi-channel analyzer 42 receives the output 36 of the delay circuit 34 and the output 26 of the gamma detector 22 (or output 40 of the amplifier 38, if present). The multi-channel analyzer 42 compares the respective outputs 36, 26 (or 36, 40) to correlate the delayed alpha or beta emissions with the gamma emissions. The coincidence timing allows the multi-channel analyzer 42 to correlate alpha and/or beta emissions falling within the predetermined magnitude to gamma emissions from the same sample 12, indicating the presence and/or amount of the particular radionuclide in the sample 12. Based on this coincidence comparison, the multi-channel analyzer 42 may produce a signal 44 reflective of the radionuclide in the sample 12.

Figure 2:
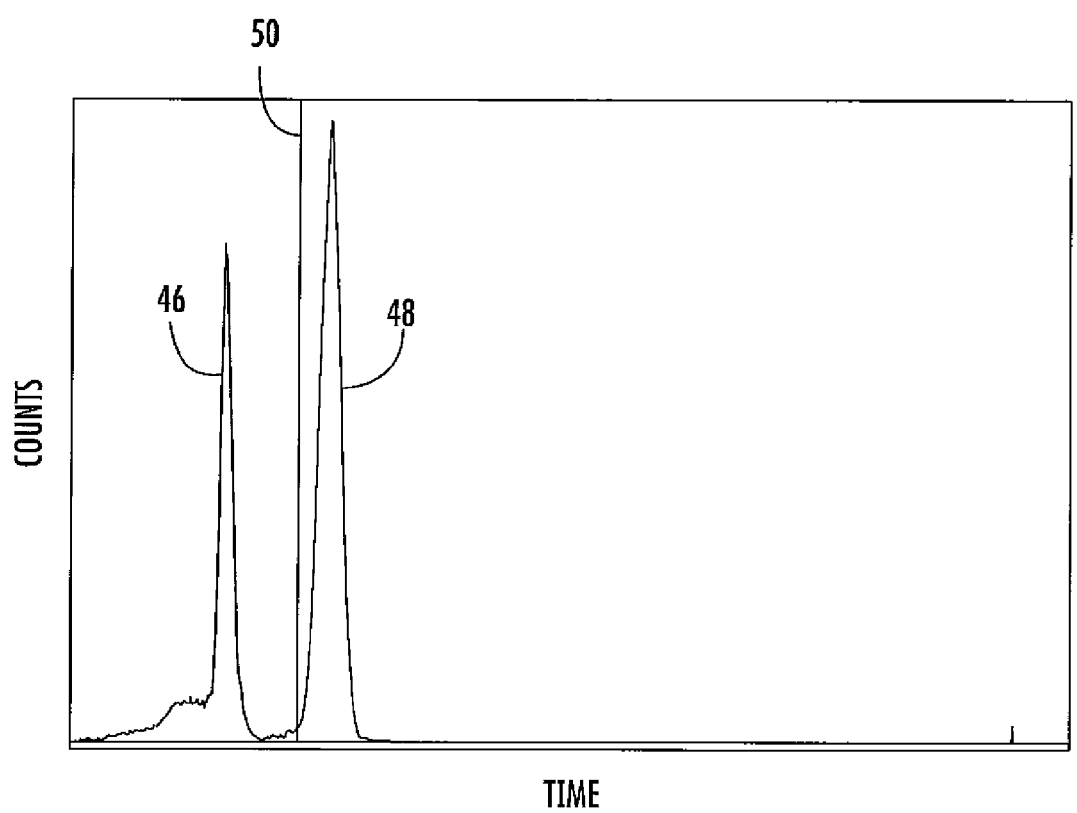
FIG. 2 is a graph of an exemplary output of the liquid scintillation detector shown in FIG. 1.

FIGS. 2-7 provide graphs of exemplary outputs of the various components shown in FIG. 1 to illustrate the operation, function, and potential benefits of the system 10. For example, FIG. 2 provides an exemplary output 24 of the liquid scintillation detector 16 assaying a sample containing the radionuclide $^{226}$Ra. The $^{226}$Ra and its daughter isotopes undergo a series of decays to produce one or more alpha and beta particles, and the liquid scintillation detector 16 detects the scintillations produced by the alpha and beta emissions. Specifically, as shown in FIG. 2, the beta-induced scintillations produce a first peak 46 having a lower voltage than the subsequent peak 48 produced by the alpha-induced scintillations. A pulse shape discriminator set point 50 may be programmed or adjusted in the liquid scintillation detector 16 to discriminate between the peaks 46, 48 produced by the alpha and beta emissions.

Figure 3:
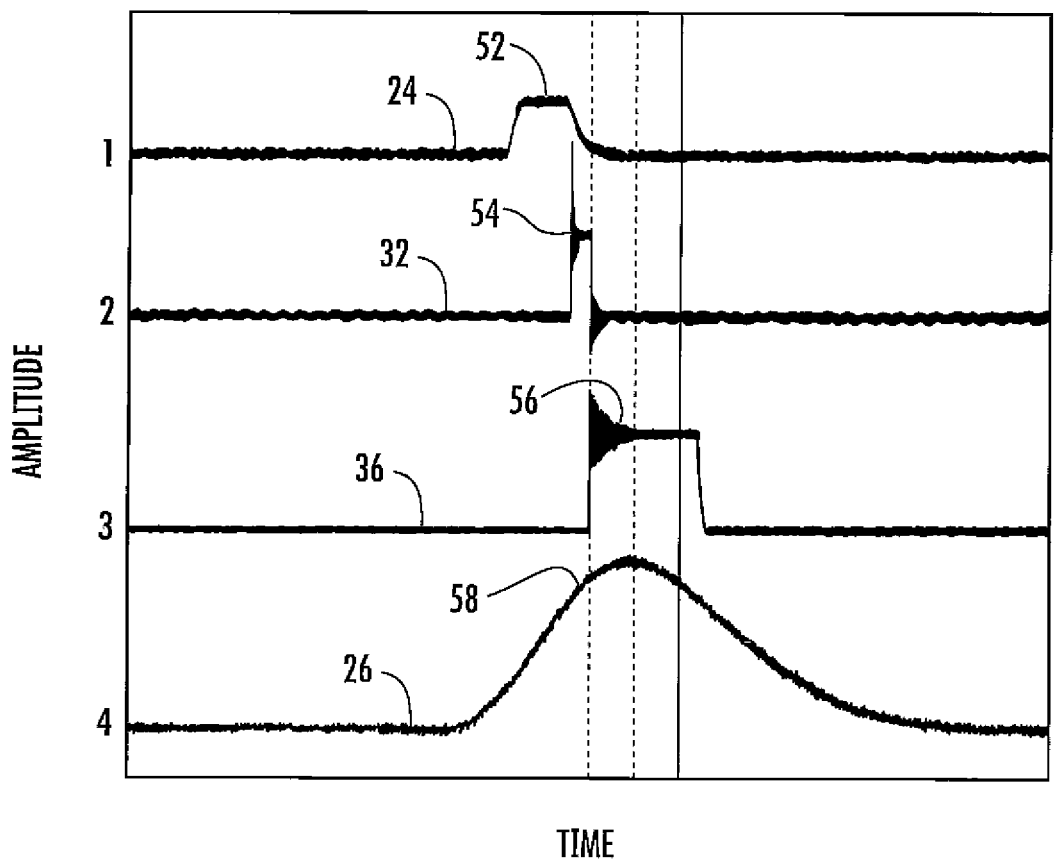
FIG. 3 is a composite graph of exemplary outputs of the components shown in FIG. 1.

FIG. 3 provides an exemplary composite graph of the liquid scintillation detector output 24, the single-channel analyzer output 32, the delay circuit output 36, and the gamma detector output 26. As shown, the liquid scintillation detector output 24 includes a pulse 52 indicating detection of an alpha or beta emission, either of which may be selected, depending on the anticipated radionuclide present in the sample 12. The single-channel analyzer 28 receives the liquid scintillation detector output 24 and in turn produces a pulse 54 in the single-channel analyzer output 32. The delay circuit 34 receives the pulse 54 in the single-channel analyzer output 32 and in turn produces a delayed pulse 56 having a predetermined amplitude, polarity, and width. Independently, the gamma detector output 26 includes a pulse 58 indicating detection of a gamma emission. As previously discussed, the multi-channel analyzer 42 receives the delay circuit output 36 and the gamma detector output 26 (or the amplifier output 40, if present). As shown in the exemplary composite graph shown in FIG. 3, the coincidence between the delayed pulse 56 in the delay circuit output 36 and the pulse 58 in the gamma detector output 26 would confirm the presence of the particular radionuclide being assayed.

Figure 4:
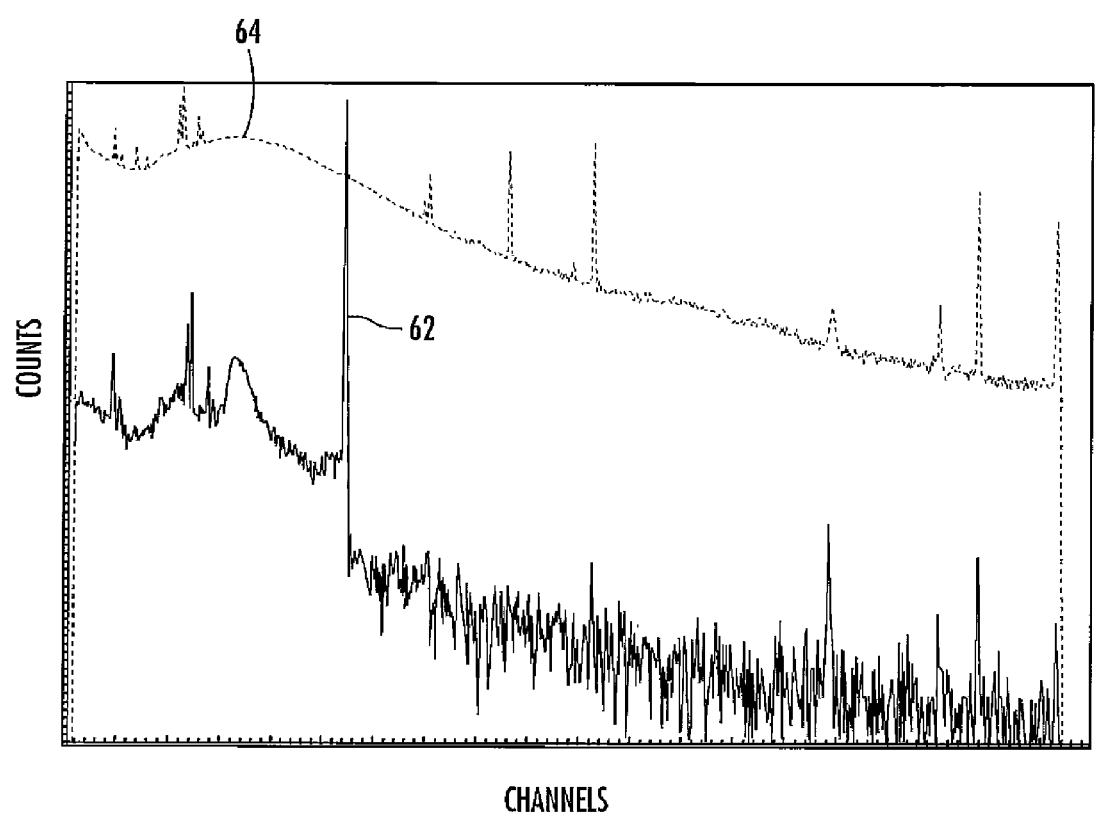
FIG. 4 is a graph of exemplary outputs of the gamma detector and multi-channel analyzer shown in FIG. 1 in the presence of $^{226}$Ra according to a first embodiment of the present invention.

FIG. 4 provides exemplary graphs of gated 62 and un-gated 64 outputs of the multi-channel analyzer 42 shown in FIG. 1 in the presence of $^{226}$Ra according to a first embodiment of the present invention. In this particular embodiment, a PER-ALS spectrometer is used as the liquid scintillation detector 16 and set to detect alpha emissions, and a high purity germanium (HPGe) low energy photon spectrometer (LEPS) is used as the gamma detector 22. As shown, the un-gated output 64 includes multiple pulses produced by gamma emissions from other radionuclides or other background radiation present in or around the sample 12. As a result, the specific gamma emissions produced by daughter isotopes of $^{226}$Ra are difficult to reliably distinguish from the other background emissions in the un-gated output 64. In contrast, the coincidence circuit 20 allows the system 10 to effectively ignore the background emissions to reliably detect the gamma emissions that coincide with the alpha emissions produced in the $^{226}$Ra decay chain. Specifically, the delayed pulse 56 in the delay circuit output 36 allows the multi-channel analyzer 42 to reliably detect the coincidental pulse 58 in the gamma detector output 26. As shown in FIG. 4, the coincidence circuit 20 thus substantially reduces the noise from the background emissions so that the characteristic gamma emissions produced in the $^{226}$Ra decay chain are readily identifiable in the gated output 62, which generally corresponds to the multi-channel analyzer signal 44 shown in FIG. 1.

Figure 5:
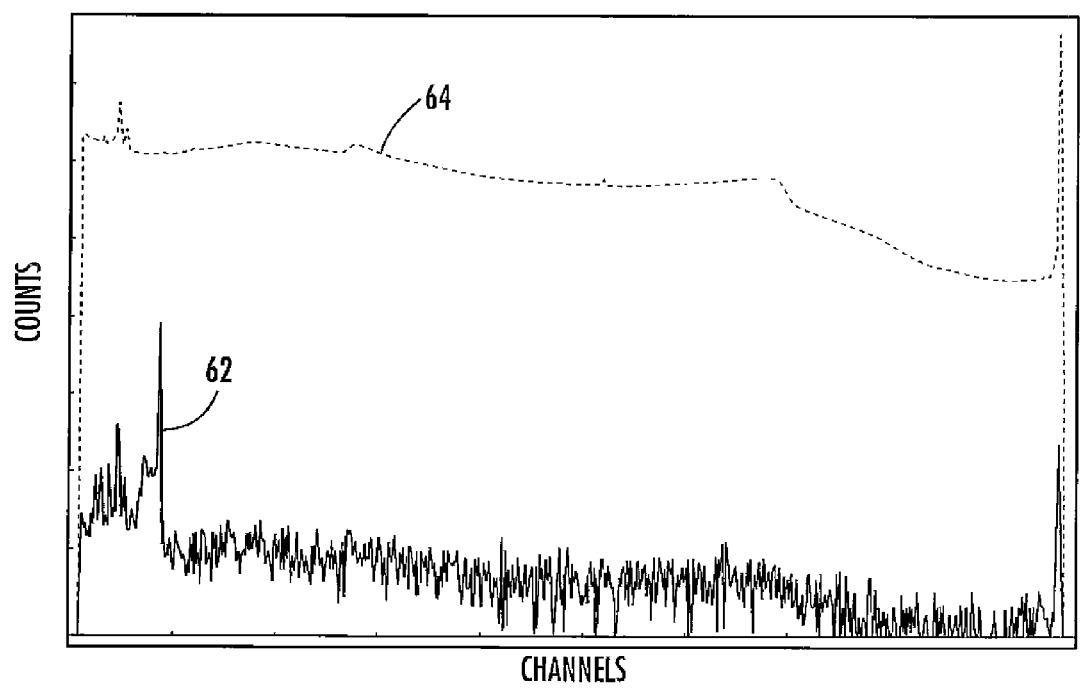
FIG. 5 is a graph of exemplary outputs of the gamma detector and multi-channel analyzer shown in FIG. 1 in the presence of $^{241}$Am according to the first embodiment of the present invention.

FIG. 5 provides exemplary graphs of gated 62 and un-gated 64 outputs of the multi-channel analyzer 42 shown in FIG. 1 in the presence of $^{241}$Am according to the first embodiment of the present invention. As previously described with respect to FIG. 4, the un-gated output 64 includes multiple pulses produced by gamma emissions from other radionuclides or other background radiation present in or around the sample 12, and the specific gamma emissions produced by daughter isotopes of $^{241}$Am are again difficult to reliably distinguish from the other background emissions. Again, however, the coincidence circuit 20 allows the system 10 to effectively ignore the background emissions to reliably detect the gamma emissions that coincide with the alpha emissions produced in the $^{241}$Am decay chain. As a result, the characteristic gamma emissions produced in the $^{241}$Am decay chain are readily identifiable in the gated output 62, which generally corresponds to the multi-channel analyzer signal 44 shown in FIG. 1.

Figure 6:
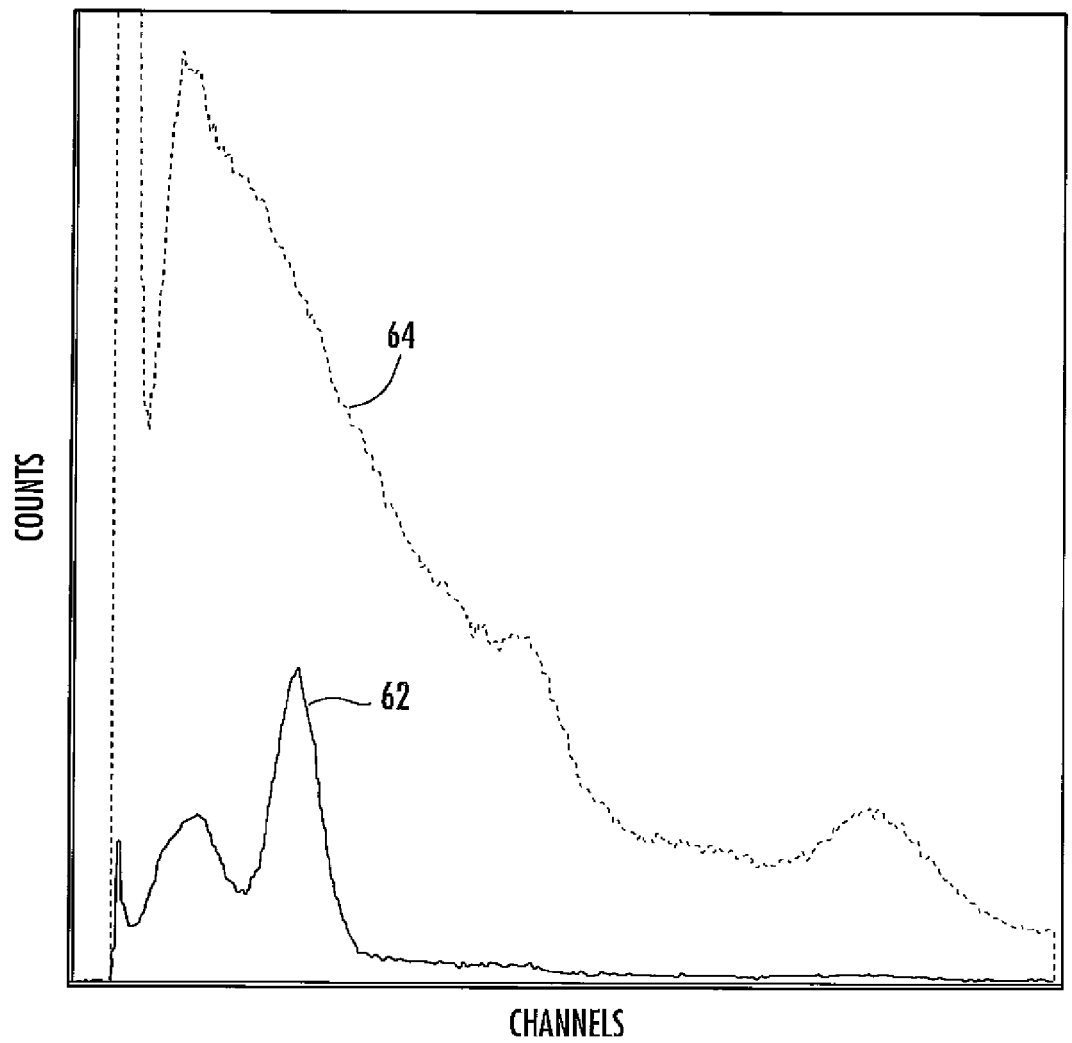
FIG. 6 is a graph of exemplary outputs of the gamma detector and multi-channel analyzer shown in FIG. 1 according to a second embodiment of the present invention.

FIG. 6 provides exemplary graphs of gated 62 and un-gated 64 outputs of the multi-channel analyzer 42 shown in FIG. 1 in the presence of $^{226}$Ra according to a second embodiment of the present invention. In this particular embodiment, a PER-ALS detector is again used as the liquid scintillation detector 16 and set to detect alpha emissions; however, a bismuth germanate (BGO) detector is used as the gamma detector 22. As in the previous embodiment, the un-gated output 64 again includes multiple pulses produced by gamma emissions from the other radionuclides or other background radiation present in or around the sample 12, and the lower resolution of the BGO detector makes reliable detection of the specific gamma emissions produced by daughter isotopes of $^{226}$Ra even more difficult. However, the coincidence circuit 20 again allows the system 10 to effectively ignore the background emissions to reliably detect the gamma emissions that coincide with the alpha emissions produced in the $^{226}$Ra decay chain. As shown in FIG. 6, the characteristic gamma emissions produced in the $^{226}$Ra decay chain are readily identifiable in the gated output 62 even though the lower resolution BGO detector is used as the gamma detector 22.

Figure 7:
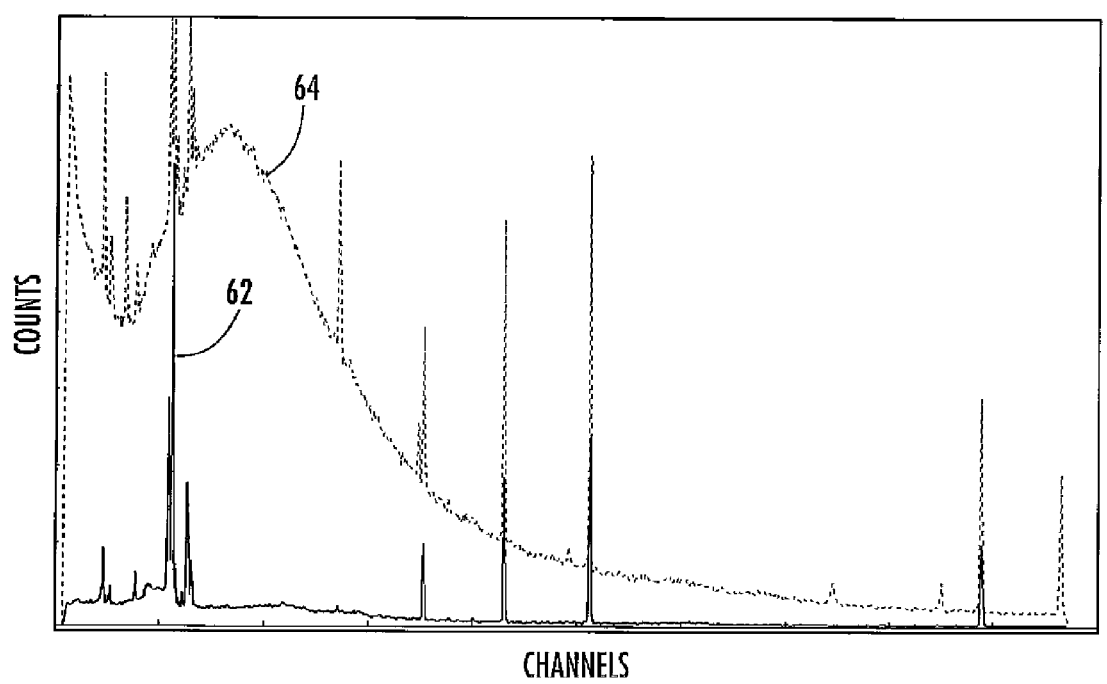
FIG. 7 is a graph of exemplary outputs of the gamma detector and multi-channel analyzer shown in FIG. 1 according to a third embodiment of the present invention.

FIG. 7 provides exemplary graphs of gated 62 and un-gated 64 outputs of the multi-channel analyzer 42 shown in FIG. 1 in the presence of $^{226}$Ra according to a third embodiment of the present invention. In this particular embodiment, a PER-ALS detector is again used as the liquid scintillation detector 16, and a high purity germanium (HPGe) low energy photon spectrometer (LEPS) is again used as the gamma detector 22. However, the single channel analyzer 28 is set to detect or pass beta emissions from the $^{226}$Ra decay chain to the coincidence circuit 20. As shown in FIG. 7, the coincidence circuit 20 again allows the system 10 to effectively ignore the background emissions to reliably detect the gamma emissions that coincide with the beta emissions produced in the $^{226}$Ra decay chain. As shown in FIG. 7, the coincidence circuit 20 thus substantially reduces the noise from the background emissions so that the characteristic gamma emissions produced in the $^{226}$Ra decay chain are readily identifiable in the in the gated output 62.

Referring again the FIG. 1, the system 10 may further include a processor 60 that receives the signal 44 from the multi-channel analyzer. As described herein, the technical effect of the processor 60 is to generate a quantitative assessment of the radionuclide in the sample 12 using well-known simultaneous decay calculations known to one of ordinary skill in the art. The processor 60 may comprise any combination of microprocessors, circuitry, or other programmed logic circuits and is not limited to any particular hardware architecture or configuration. Embodiments of the systems and methods set forth herein may be implemented by one or more general-purpose or customized processors 60 adapted in any suitable manner to provide the desired functionality. The processor 60 may be adapted to provide additional functionality, either complementary or unrelated to the present subject matter. For instance, one or more processors 60 may be adapted to provide the described functionality by accessing software instructions rendered in a computer-readable form. When software is used, any suitable programming, scripting, or other type of language or combinations of languages may be used to implement the teachings contained herein. However, software need not be used exclusively, or at all. For example, as will be understood by those of ordinary skill in the art without required additional detailed discussion, some embodiments of the systems and methods set forth and disclosed herein may also be implemented by hard-wired logic or other circuitry, including, but not limited to application-specific circuits. Of course, various combinations of computer-executed software and hard-wired logic or other circuitry may be suitable, as well.

The system 10 shown and described with respect to FIGS. 1-7 may also provide a method for assaying the particular radionuclide. For example, the method may include selecting the sample 12 to be tested, detecting at least one of alpha or beta emissions from the sample 12 with the liquid scintillation detector 16, producing the liquid scintillation detector output 24 reflective of at least one of the alpha or beta emissions detected from the sample 12, and delaying the output 24 a predetermined time. The method may further include detecting gamma emissions from the sample 12, producing the gamma detector output 26 reflective of the gamma emissions detected from the sample, and combining the delayed liquid scintillation detector output 24 with the gamma detector output 26 to produce the multi-channel analyzer signal 44 reflective of the radionuclide in the sample 12. In particular embodiments, the method may further include placing the sample 12 to be tested in the carbon polymer housing 14 and/or generating a quantitative assessment of the radionuclide in the sample 12 based on the multi-channel analyzer signal 44.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for assaying a radionuclide in a sample, comprising:
   a. a liquid scintillation detector;
   b. a single-channel analyzer connected to an output of said liquid scintillation detector;
   c. a delay circuit connected to an output of said single-channel analyzer;
   d. a gamma detector; and
   e. a multi-channel analyzer connected to an output of said delay circuit and an output of said gamma detector, wherein said multi-channel analyzer produces a signal reflective of the radionuclide in the sample.

2. The system as in claim 1, wherein said liquid scintillation detector comprises a photon-electron rejecting alpha liquid scintillation detector.

3. The system as in claim 1, wherein said output of said liquid scintillation detector is reflective of at least one of alpha or beta decay of the radionuclide in the sample.

4. The system as in claim 1, wherein said liquid scintillation detector comprises a carbon polymer housing.

5. The system as in claim 1, wherein said gamma detector comprises at least one of a high purity germanium low energy photon spectrometer or a bismuth germinate detector.

6. The system as in claim 1, further comprising an amplifier between said gamma detector and said multi-channel analyzer.

7. The system as in claim 1, further comprising a connection between said liquid scintillation detector and said gamma detector.

8. The system as in claim 1, wherein said signal produced by said multi-channel analyzer reflects a coincidence between at least one of alpha or beta decay and gamma decay of the radionuclide in the sample.

9. The system as in claim 1, further comprising a processor programmed to receive said signal from said multi-channel analyzer and generate a quantitative assessment of the radionuclide in the sample.

10. A system for assaying a radionuclide in a sample, comprising:
    a. a sample chamber;
    b. a liquid scintillation detector connected to said sample chamber;
    c. a gamma detector connected to said sample chamber;
    d. a single-channel analyzer connected to an output of said liquid scintillation detector;
    e. a delay circuit connected to an output of said single-channel analyzer;
    f. an amplifier connected to an output of said gamma detector; and
    g. a multi-channel analyzer connected to an output of said delay circuit and an output of said amplifier, wherein said multi-channel analyzer produces a signal reflective of the radionuclide in the sample.

11. The system as in claim 10, wherein said sample chamber comprises a carbon polymer housing.

12. The system as in claim 10, wherein said liquid scintillation detector comprises a photon-electron rejecting alpha liquid scintillation detector.

13. The system as in claim 10, wherein said output of said liquid scintillation detector is reflective of at least one of alpha or beta decay of the radionuclide in the sample.

14. The system as in claim 10, wherein said gamma detector comprises at least one of a high purity germanium low energy photon spectrometer or a bismuth germinate detector.

15. The system as in claim 10, wherein said signal produced by said multi-channel analyzer reflects a coincidence between at least one of alpha or beta decay and gamma decay of the radionuclide in the sample.

16. The system as in claim 10, further comprising a processor programmed to receive said signal from said multi-channel analyzer and generate a quantitative assessment of the radionuclide in the sample.

17. A method for assaying a radionuclide comprising:
   a. selecting a sample to be tested;
   b. detecting at least one of alpha or beta emissions from the sample with a liquid scintillation detector;
   c. producing a first signal reflective of at least one of the alpha or beta emissions detected from the sample;
   d. delaying the first signal a predetermined time;
   e. detecting gamma emissions from the sample;
   f. producing a second signal reflective of the gamma emissions detected from the sample; and
   g. combining the delayed first signal with the second signal to produce a third signal reflective of the radionuclide in the sample.

18. The method as in claim 17, further comprising placing the sample to be tested in a carbon polymer housing.

19. The method as in claim 17, further comprising generating a quantitative assessment of the radionuclide in the sample based on the third signal.

\* \* \* \* \*